(12) United States Patent
Error et al.

(10) Patent No.: US 8,117,114 B2
(45) Date of Patent: Feb. 14, 2012

(54) DIRECT TRACKING OF KEYWORDS TO ADS/TEXT

(75) Inventors: Brett Michael Error, Orem, UT (US); Richard Zinn, Saratoga Springs, UT (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 13/078,306

(22) Filed: Apr. 1, 2011

(65) Prior Publication Data

US 2011/0178864 A1    Jul. 21, 2011

Related U.S. Application Data

(63) Continuation of application No. 11/554,018, filed on Oct. 28, 2006, now Pat. No. 7,930,236.

(60) Provisional application No. 60/731,329, filed on Oct. 28, 2005.

(51) Int. Cl.
    *G06Q 40/00*    (2006.01)
(52) U.S. Cl. .................. 705/37; 705/14.41; 705/14.45; 705/35
(58) Field of Classification Search .............. 705/14.41, 705/14.45, 35, 37
    See application file for complete search history.

(56) References Cited

U.S. PATENT DOCUMENTS

| | | | |
|---|---|---|---|
| 6,560,639 | B1 | 5/2003 | Dan et al. |
| 7,003,528 | B2 | 2/2006 | Dan et al. |
| 7,043,473 | B1 | 5/2006 | Rassool et al. |
| 7,281,042 | B2 | 10/2007 | Hsu et al. |
| 7,401,140 | B2 | 7/2008 | Goulden et al. |
| 7,594,013 | B2 | 9/2009 | Wang et al. |
| 2003/0033292 | A1 | 2/2003 | Meisel et al. |
| 2003/0093285 | A1 | 5/2003 | Colace et al. |
| 2004/0006478 | A1 | 1/2004 | Alpdemir et al. |
| 2005/0021440 | A1 | 1/2005 | Dresden |
| 2005/0076017 | A1 | 4/2005 | Rein et al. |
| 2005/0137939 | A1 | 6/2005 | Calabria et al. |
| 2005/0144064 | A1 | 6/2005 | Calabria et al. |
| 2005/0144065 | A1 | 6/2005 | Calabria et al. |
| 2005/0154717 | A1 | 7/2005 | Watson et al. |

FOREIGN PATENT DOCUMENTS

JP    2005-196715    7/2005

OTHER PUBLICATIONS

PCT International Search Report and Written Opinion, PCT/US06/42485, Mar. 28, 2008, 9 pages. International Search Report for Application No. 06836711.9-2221 / 1952284 PCT/US2006042485, mailed Mar. 3, 2011, 7 pages.
Kitts, et al., "A Trading Agent and Simulator for Keyword Auctions," ACM, Jul. 19-23, 2004, 8 pages.
Office Action from Japanese Application No. P2008-538105, mailed Oct. 11, 2011, English Translation and Japanese copy, all pages.

*Primary Examiner* — Lalita Hamilton
(74) *Attorney, Agent, or Firm* — Robert C. Kowert; Meyertons, Hood, Kivlin, Kowert & Goetzel, P.C.

(57) ABSTRACT

The present invention overcomes the deficiencies and limitations of the prior art by providing a direct tracking module for keywords. In one embodiment, the system comprises a direct tracking module, a bid management system, a web analytics tool and a search engine. The direct tracking module interfaces with the bid management system to provide user interfaces for reviewing data about specific keyword and ads/text pairs. The direct tracking module uses unique codes to provide specific information about which combination of keyword and text generated specific Web traffic, such as traffic that generated a sale. This is particularly advantageous because the keyword/text pairs that generate a large number of sales can be reused to generate future traffic. Similarly, keyword/text pairs that do not generate Web traffic can be eliminated from the words that are purchased by the advertiser. Thus, the present invention greatly reduces the uncertainty presently provided by keyword purchasing schemes offered by present-day search engines. The present invention also includes a novel method for the direct tracking of keywords to ads/text.

18 Claims, 17 Drawing Sheets

800

Add Keyword Groups

Campaign Name: Brad's High Tech

Google | Msn.com | Search.com | Yahoo

Define Max CPC and Destination URL

| Keyword | CPC | Destination URL |
|---|---|---|
| 1. keyword a | $xx.xx | http://www.jinglegram.com/adref/85 |
| 2. keyword b | $xx.xx | http://www.jinglegram.com/adref/857 |
| 3. keyword c | $xx.xx | http://www.jinglegram.com/sumprom/001 |
| 4. keyword d | $xx.xx | http://www.jinglegram.com/winprom/3/timewin.html |
| 5. keyword e | $xx.xx | http://www.jinglegram.com/winprom/3/timedos/secondtimeoffer/3998 |
| 6. keyword f | $xx.xx | http://www.jinglegram.com/winprom/singagram/timedos/secondtimeoffer/3998 |
| 7. keyword g | $xx.xx | http://www.jinglegram.com/winprom/3/timedos/secondtimeoffer/3998 |
| 8. keyword h | $xx.xx | http://www.jinglegram.com/sumprom/001 |
| 9. keyword i | $xx.xx | http://www.jinglegram.com/adref/45 |
| 10. keyword j | $xx.xx | http://www.jinglegram.com/sedridf/85 |
| 11. keyword k | $xx.xx | http://www.jinglegram.com/winprom/3/timedos/secondtimeoffer/3998 |
| 12. keywod l | $xx.xx | http://www.jinglegram.com/sumprom/001 |
| 13. keyword m | $xx.xx | http://www.jinglegram.com/winprom/singagram/timedos/secondtimeoffer/3898 |

Campaign Daily Budget: $xx.xx

Advanced: Estimate Traffic — 1302

Next >>

Save

View Bids

Competitor Bids

Type in a search term to see the Max Bid and listings for that term.

| Keyword One | Search | Clear |

1. Development Tools for Microchip PIC
   Phyton Emulators, simulators, debuggers, compilers and programmers for over 100 Microchip PIC microcontrollers of 12, 16, 17 and 18 series.
   www.phyton.com
   (Advertiser's Max Bid: $0.21)

2. DIY Microchip PIC Projects
   Find schematics, code and tutorials. Share your design ideas. PColtrane.com.
   www.pcoltrane.com
   (Advertiser's Max Bid: $0.21)

3. Microchip Pic at Amazon.com
   Buy books at Amazon.com. Low prices and easy shipping. Search the full text of books. Free Super Saver Shipping on qualified orders over $25.
   www.amazon.com
   (Advertiser's Max Bid: $0.21)

4. Programmer and Emulator Adaptors
   Programmer, emulator and prototyping adapters for microchip PIC devices and memories. PLCC, DIP, QFP, SSOP, TSOP, and TSSOP packages supported.
   www.logicalsys.com
   (Advertiser's Max Bid: $0.21)

*Figure 17*

DIRECT TRACKING OF KEYWORDS TO ADS/TEXT

CROSS-REFERENCE TO RELATED APPLICATION

This application is a continuation of U.S. application Ser. No. 11/554,018, filed Oct. 28, 2006 now U.S. Pat. No. 7,930, 236, which claims priority to U.S. Provisional Application Ser. No. 60/731,329, filed Oct. 28, 2005, the entirety of which is hereby incorporated by reference.

BACKGROUND OF THE INVENTION

1. Field of the Invention

The present invention relates to a system and methods interfacing with Internet search engines, bid management systems and web analytic systems. In particular, the present invention relates to systems and methods for the direct (1:1) tracking of keywords to advertisements (Ads)/text.

2. Description of the Background Art

With the development of the Internet, a number of new business models for producing sales and generating revenue have been developed. For example, it is now commonplace for search engines to allow advertisers to purchase keywords and display their associated advertising in response to searches or queries on such keywords. The pricing of such keywords can vary depending on a number of factors including the number of advertisers that want to purchase such keywords, the number of searches including such keywords and other factors. Presently, the management of such keywords is largely performed manually with human users inputting keywords. For example, keywords are currently managed using any one of a number of spreadsheet or document formats. Users typically list the keywords in a document or spreadsheet, then convert the document, so that the keywords are listed in a format such as comma-separated values, and finally, that data is converted and uploaded into a search engine. Large advertising campaigns can have tens of thousands of keywords as part of an Internet marketing strategy.

Referring now to FIG. 1, a conventional scheme used by search engines to pair keywords with text or advertisements is shown. Typically, an advertiser will purchase a number of keywords (keyword 1 to keyword n) according to prices provided by the search engines. The advertiser will also provide one or more ads/text. Then responsive to search inputs by users the search engine will choose, based on the selected keyword, one of the ads/text from a list provided by the advertiser. In the prior art, the search engine randomly pairs keywords with ads/text or selects the ad's last text on a rotating basis: first using ad 1, next using ad 2, next using ad 3, etc. until the nth ad is used and returns to ad 1.

Referring now to FIG. 2, the operation of the constituent components is shown in more detail. In a first step, the keyword is selected based on the search criteria input by the user. Then in a next step, an ad/text is selected from a list of possible advertisements. The keyword-ad pair is then provided as part of the web page to the user.

However, one problem with prior art schemes is that it is very difficult to determine which keywords are associated with which ads, and in turn with customer or user traffic associated with the ads as measured by click-throughs, other Web traffic metrics and purchases. Since the ads are randomly or rotationally associated with keywords, it is very difficult to determine which ads in keywords are responsible for generating traffic to the web site that yields sales. Thus, there is a need for a system and method that is able to provide more analytical data that directly associates Web traffic with specific keyword/add pairs.

SUMMARY OF THE INVENTION

The present invention overcomes the deficiencies and limitations of the prior art by providing a direct tracking module for keywords. In one embodiment, the system comprises a direct tracking module, a bid management system, a web analytics tool and a search engine. The direct tracking module interfaces with the bid management system 304 to provide user interfaces for reviewing data about specific keyword and ads/text pairs. The direct tracking module uses unique codes to provide specific information about which combination of keyword and text generated specific Web traffic, such as traffic that generated a sale. This is particularly advantageous because the keyword/text pairs that generate a large number of sales can be reused to generate future traffic. Similarly, keyword/text pairs that do not generate Web traffic can be eliminated from the words that are purchased by the advertiser. Thus, the present invention greatly reduces the uncertainty presently provided by keyword purchasing schemes offered by present-day search engines. The present invention also includes a novel method for the direct tracking of keywords to ad/text.

BRIEF DESCRIPTION OF THE DRAWINGS

The present invention is illustrated by way of example, and not by way of limitation in the figures of the accompanying drawings in which like reference numerals are used to refer to similar elements.

FIG. 7-17 are example graphical user interfaces provided by the bid management system or the direct tracking module in accordance with an embodiment of the present invention.

DETAILED DESCRIPTION OF THE PREFERRED EMBODIMENTS

A direct tracking module and a method for using same are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described primarily with reference to printing documents for reading.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

Moreover, the present invention claimed below may operate on or work in conjunction with an information system or network. For example, the invention can operate as a server or communicate with a network with additional functionality varying depending on the configuration. Thus, the present invention is capable of operating with any information system—from those with minimal functionality to those providing all the functionality disclosed herein.

System Including the Direct Tracking Module

Figure 3:
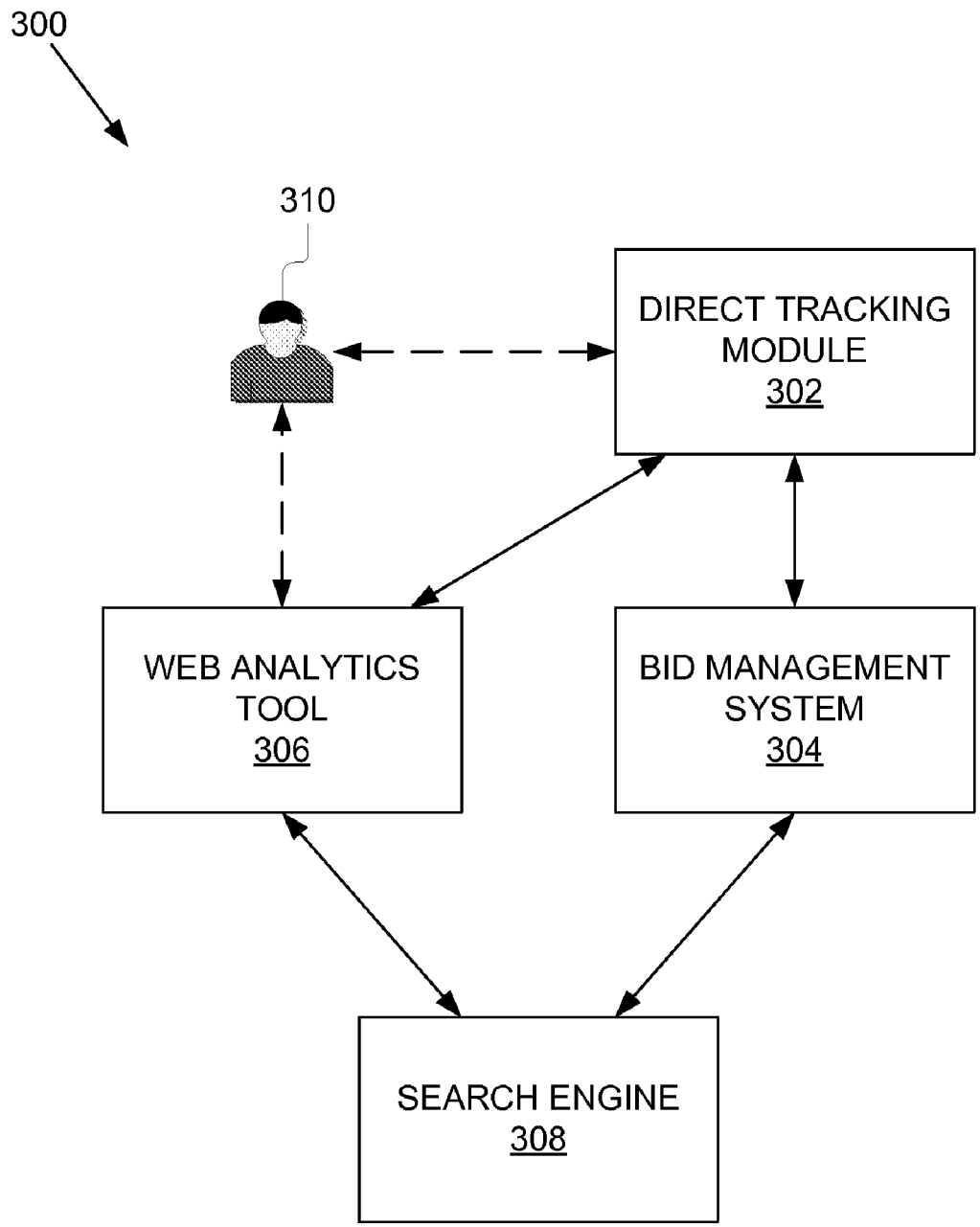
FIG. 3 is a block diagram of an embodiment of the system according to the present invention including a direct tracking module.

The present invention overcomes the shortcomings of the prior art by providing a system 300 and methods for directly tracking keywords to ads/text. FIG. 3 shows a system 300 in accordance with an embodiment of the present invention. The system 300 comprises a direct tracking module 302, a bid management system 304, a web analytics tool 306 and a search engine 308. A user 310 interfaces (as delineated with the dashed lines) with the direct tracking module 302 and the web analytics tool 306. The user 310 interacts with the direct tracking module 302 to select keywords, associate the keywords with ads/text, and create advertising campaigns as will be described in detail below. The user 310 interacts with the web analytics tool 306 to track and monitor traffic over a user's web site.

Figure 1:
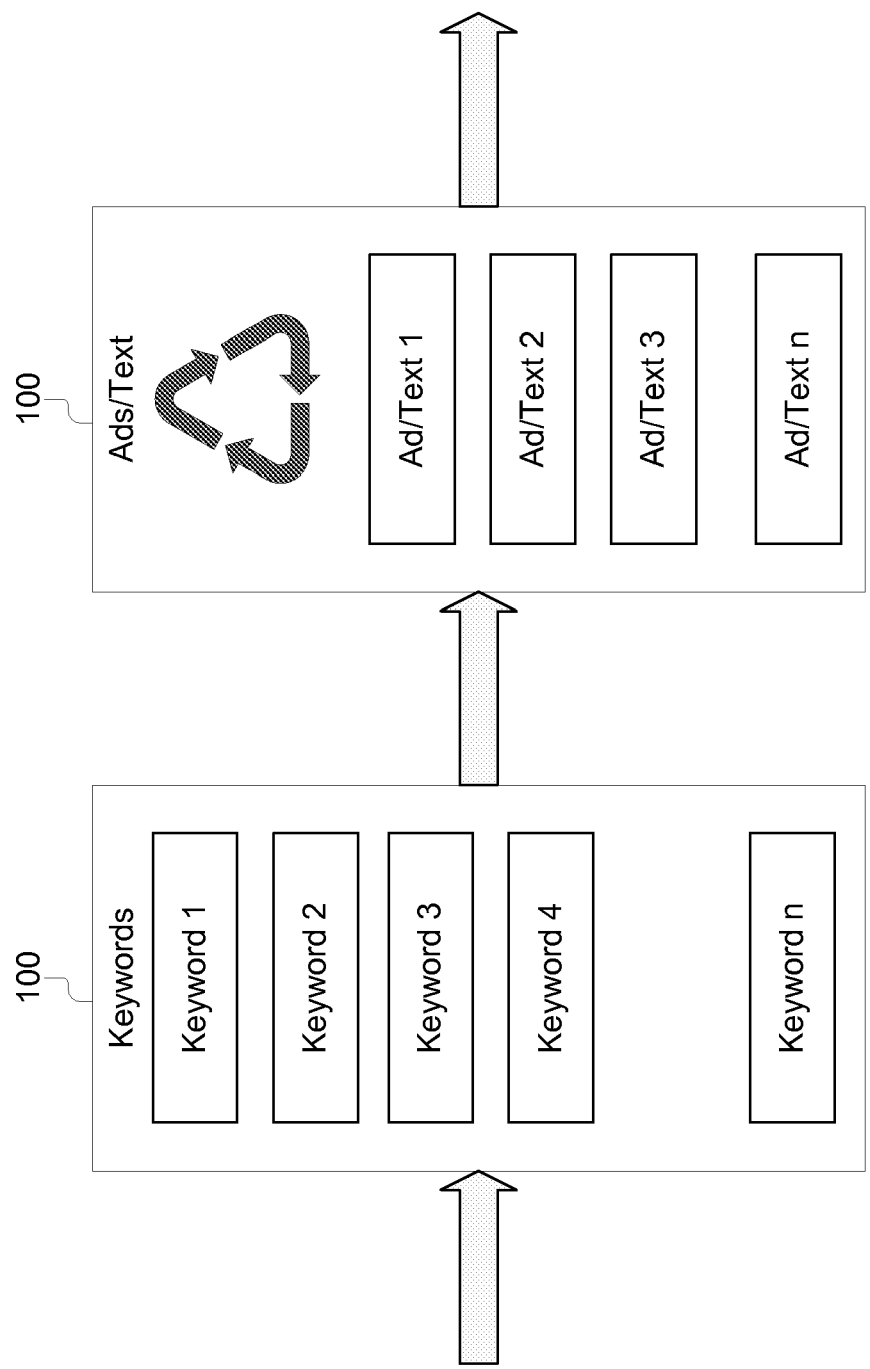
FIG. 1 is a block diagram of a conventional scheme used by search engines to pair keywords with text or advertisements.
Figure 2:
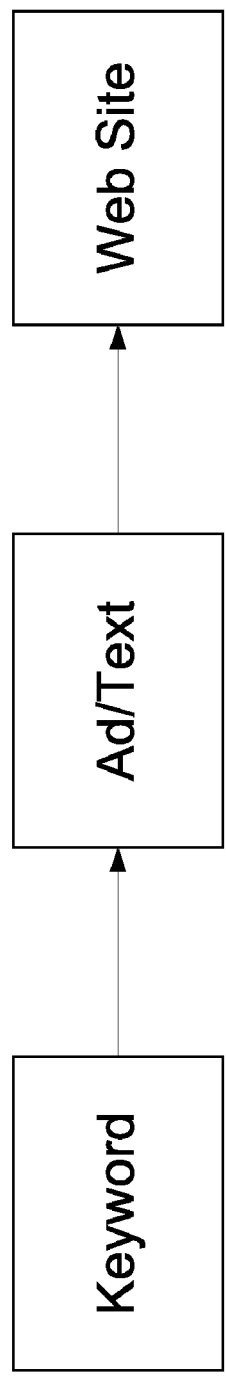
FIG. 2 is block diagram of a conventional flow for buying keywords and creating web pages.

In one embodiment, the direct tracking module 302 is coupled for communication with the search engine 308, the bid management system 304 and the web analytics tool 306 for directly tracking web site visitation statistics related to specific keyword and ads/text. As shown in FIG. 3, the direct tracking module 302 interfaces with the bid management system 304 to provide user interfaces for reviewing data about specific keyword and ads/text pairs. The direct tracking module 302 is coupled to the web analytics tool 306 to measure performance and monitor use and traffic across a user's website with regard to the specific keyword and ads/text pairs. The direct tracking module 302 advantageously creates a unique tracking code for each specific keyword and ads/text pair. As shown in the example of Table 1 below, there is a unique code for each possible combination of a keyword with ads/text. Table 1 below corresponds to the example keywords and ads/text pairs used in the process shown in FIG. 1.

TABLE 1

| Keyword | Ads/Text | Unique Code |
| --- | --- | --- |
| Keyword 1 | Ad/Text 1 | UC1 |
| Keyword 1 | Ad/Text 2 | UC2 |
| Keyword 1 | Ad/Text 3 | UC3 |
| Keyword 1 | Ad/Text n | UC4 |
| Keyword 2 | Ad/Text 1 | UC5 |

TABLE 1-continued

| Keyword | Ads/Text | Unique Code |
| --- | --- | --- |
| Keyword 2 | Ad/Text 2 | UC6 |
| Keyword 2 | Ad/Text 3 | UC7 |
| Keyword 2 | Ad/Text n | UC8 |
| Keyword 3 | Ad/Text 1 | UC9 |
| Keyword 3 | Ad/Text 2 | UC10 |
| Keyword 3 | Ad/Text 3 | UC11 |
| Keyword 3 | Ad/Text n | UC12 |
| Keyword 4 | Ad/Text 1 | UC13 |
| Keyword 4 | Ad/Text 2 | UC14 |
| Keyword 4 | Ad/Text 3 | UC15 |
| Keyword 4 | Ad/Text n | UC16 |
| Keyword n | Ad/Text 1 | UC17 |
| Keyword n | Ad/Text 2 | UC18 |
| Keyword n | Ad/Text 3 | UC19 |
| Keyword n | Ad/Text n | UC20 |

The present invention is particularly advantageous because through the use of the unique code, it provides specific information about which combination of keyword and text generated specific Web traffic, such as traffic that generated a sale. This is particularly advantageous because the keyword/text pairs that generate a large number of sales can be reused to generate future traffic. Similarly, keyword/text pairs that do not generate Web traffic can be eliminated from the words that are purchased by the advertiser. Thus, the present invention greatly reduces the uncertainty presently provided by keyword purchasing schemes offered by present-day search engines.

The present invention also includes a user interface that can be used to view Web statistical data corresponding to a keyword/text pair. This user interface is particularly advantageous for identifying keyword/text pair combinations that either generate significant amounts of Web traffic, or generate no traffic as noted above. Such an example user interface will be described below with reference to FIG. 14.

The direct tracking module 302 is adapted to communicate with the bid management system 304. For example, the bid management system 304 may be SearchCenter, manufactured by Omniture, Inc. of Orem, Utah. Portions of the bid management system 304 will be described below with reference to FIGS. 7-17. The bid management system 304 is operatively connected to a search engine 308 and communicates with the search engine 308 for the placement of keywords, transfer of advertising content, and collecting keyword and traffic statistics. The bid management system 304 is also coupled to the web analytics tool 306.

The direct tracking module 302 is also adapted to communicate with the web analytics tool 306. As an example, SiteCatalyst, manufactured by Omniture, Inc. of Orem, Utah can be used as a web analytics tool 306. The web analytics tool 306 is software that measures the behavior of visitors at a website. In particular, the software measures which aspects of the website work towards the business objectives; for example, which pages encourage people to make a purchase. The web analytics tool 306 is also coupled to the search engine 308.

The web analytics tool 306 and bid management system 304 are adapted to communicate with the search engine 308. The search engine is a conventional type such as an Internet search engine like those provided by Google, Microsoft Search or Yahoo.

Figure 4:
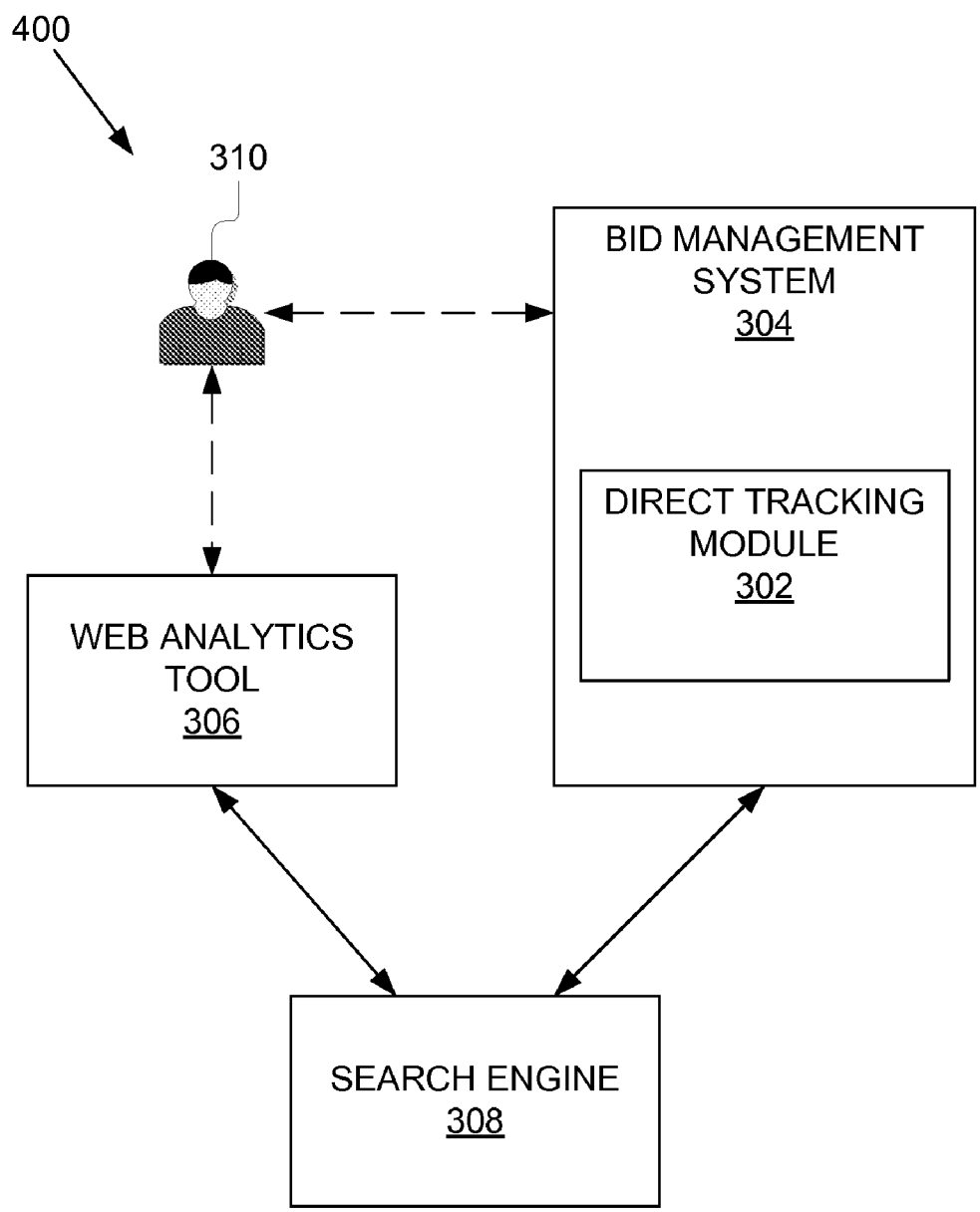
FIG. 4 is a block diagram of an embodiment of the system according to the present invention having a bid management system including a direct tracking module.

FIG. 4 shows a system 400 in accordance with another embodiment of the present invention. The system 400 has the same functionality as described above for system 300; however, in system 400, the direct tracking module 302 is part of and integrated into the bid management system 304.

Figure 5:
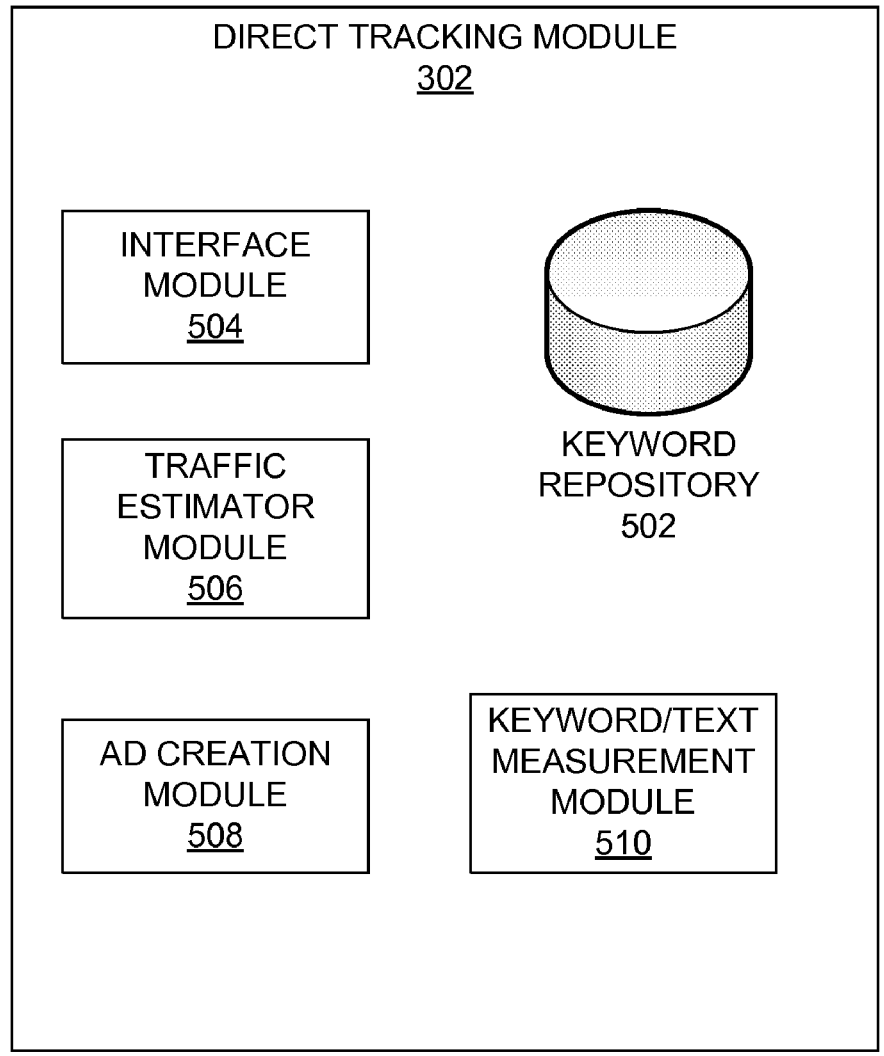
FIG. 5 is a block diagram of an embodiment of the direct tracking module in accordance with the present invention.

Referring now to FIG. 5, an embodiment of the direct tracking module 302 is shown in more detail. The direct tracking module 302 comprises a keyword and creative repository 502, an interface module 504, a traffic estimator module 506, an ad creation module 508 and a keyword/text measurement module 510.

The keyword repository 502 is a storage device for storing keywords, text and other information associated with an ad campaign. For example, the keyword and creative repository 502 is used to store the unique codes associated with keyword-ads/text pairs, keywords, text, campaign title, description, etc. The information in the keyword and creative repository 502 can be re-used for different campaigns or to re-run the same campaign. The keyword and creative repository 502 is adapted for communication with the other components of the direct tracking module 302. The keyword and creative repository 502 can also be accessed by the web analytics tool 306 and bid management system 304.

The interface module 504 is a software program operational on the direct tracking module 302 and enables communication with other components and the user 310. The interface module 504 generates and presents a graphical interface and accepts inputs from the user 310 as will be described below as an example embodiment. In one embodiment, the interface module 504 is adapted for communication with the web analytics tool 306 and the bid management system 304, such as using APIs. The interface module 504 interacts with the web analytics tool 306 to retrieve web analytics information related to the keyword-ads/text pairs. The interface module 504 interacts with the bid management system 304 to create ad campaigns, track the usage of the keyword-ads/text pairs, purchase keywords and interact with the search engine 308.

The traffic estimator module 506 is a software tool that estimates how particular keywords will traffic using a given search engine 308. This traffic estimator module 506 estimates different web analytics metrics such as cost-per-click (CPC), impressions (each time an advertisement loads on a user's screen), clicks, click-through rate (CTR), cost, etc. Based on historical information, the traffic estimator module 506 provides the user with an estimate of what the values for these metrics will be for given keyword-ads/text pairs. The traffic module 506 is adapted for communication with the web analytics tool 306 and the bid management system 304.

The ad creation module 508 is a software tool for creating an ad campaign including different interfaces to solicit data from the user and to interact with the bid management system 304 to identify the search engine 308 to be used, and keywords to be purchased, and ads/text to be associated with such keywords. The operation of the ad creation module 508 is described below with reference to FIGS. 6-17. The ad creation module 508 creates a campaign wizard that interacts with and assists the user in creating an ad campaign. The ad creation module 508 is adapted for communication with the interface module 504, the keyword repository 502 and the keyword/text measurement module 510. Using data stored in the keyword repository 502, the process of creating new ad campaigns is greatly simplified. Using the information from the keyword/text measurement module 510, the user 310 can increase the effectiveness of a new campaign by reviewing the metrics for keyword-ads/text pairs that are being selected for re-use in this campaign.

The keyword/text measurement module 510 is a software tool for measuring the success of a particular ad campaign. The keyword/text measurement module 510 is advantageous because it is able to measure different metrics directly on a keyword-ads/text pair basis. The keyword/text measurement module 510 uses the unique codes described above to provide such measurements. The keyword/text measurement module 510 operates in a similar manner as it was described above for the traffic estimator module 506; however, the keyword/text measurement module 510 is based on the actual data from the campaign. The keyword/text measurement module 510 is adapted for communication with the web analytics tool 306 to retrieve data about keyword-ads/text pairs, and is adapted for communication with the keyword repository 502 to identify [keyword—ads/text] pairs and other information about a given ad campaign.

Method for Direct Tracking

Figure 6:
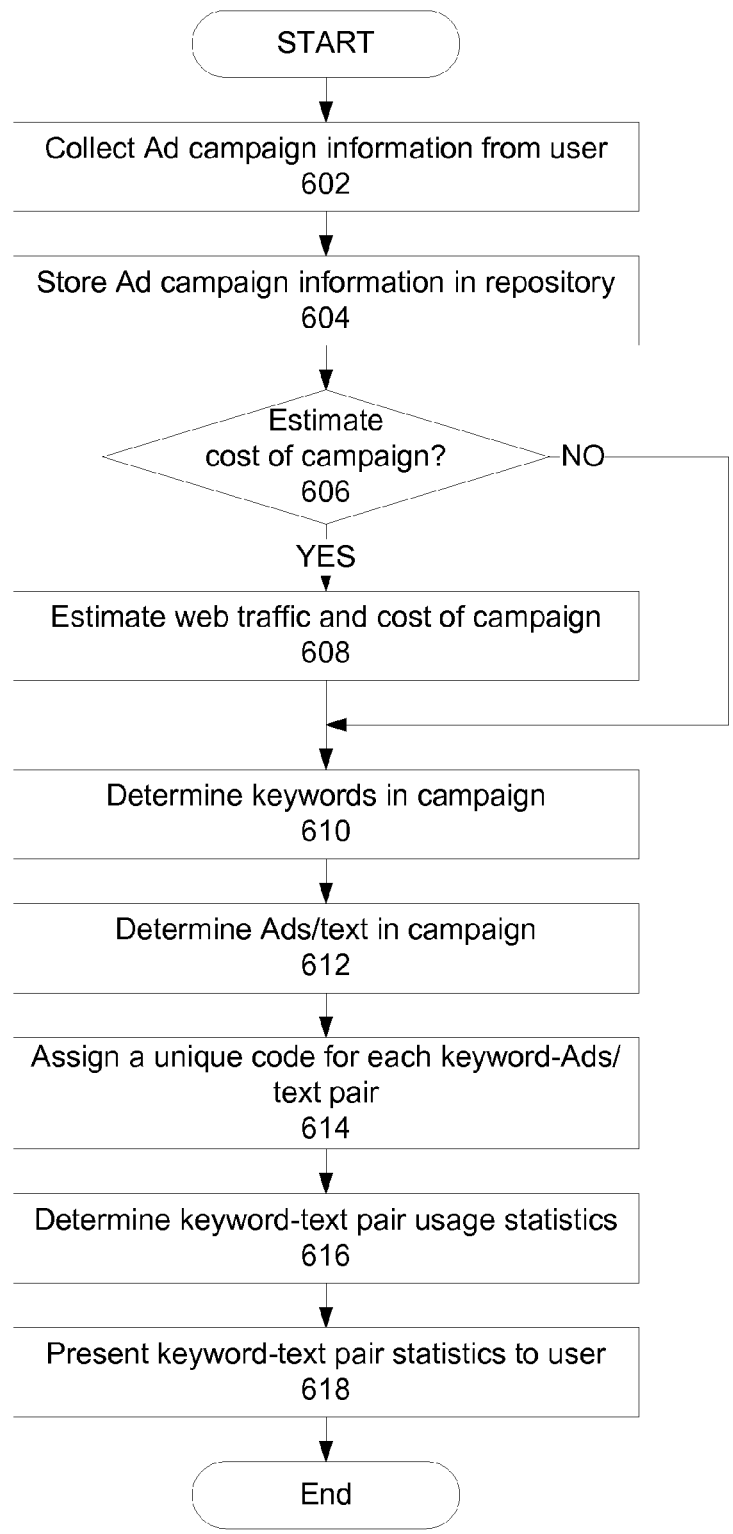
FIG. 6 is a flowchart of an embodiment of a method for direct tracking of keywords to text in accordance with the present invention.

Referring now to FIG. 6, one embodiment of a method for direct tracking of keywords to ads/text will be described. The method begins by collecting 602 ad campaign information from the user 310. This information is collected using processes and graphical user interfaces that are described below with reference to FIGS. 7-17. Next the method stores 604 the ad campaign information such as key words and associated text in the keyword repository 502. The method next determines whether the user 310 has requested an estimate of the cost for the campaign. If the user has not requested an estimate, then the method proceeds to step 610. If the user has requested an estimate, then the method estimates 608 the web traffic and cost of the campaign, and presents such information to the user in an interface such in shown in FIG. 14, then the method proceeds to step 610. Using the ad campaign information collected in step 602, the direct tracking module 302 determines 610 the keywords used in the campaign. Then the direct tracking module 302 determines 612 the ads/text used in the campaign. The direct tracking module 302 assigns a unique code for each combination of keyword and ads/text pair. This embodiment of the invention preferably creates a unique code for all possible combinations, however, in other embodiments fewer unique codes may be utilized by only providing them as subsets of keyword-ads/text pairs. As noted above, this code can then be used to provide specific performance information about a campaign's success on a keyword-ad/text pair basis. This allows the user to use combinations of keywords and ads/text that yield the best results. Once the ad campaign has been run—or even while it is being run, the direct tracking module 302 determines 616 the keyword-ads/text pair usage statistics by interfacing and retrieving the information using the web analytics tool 306. Finally, this information can be presented to the user by displaying it in an interface such as shown in FIG. 14. Those skilled in the art will recognize that this is just one embodiment and that there are a number of other embodiments, such as performing the step of determining the usage statistics and presenting them during the creation of the ad campaign using data from a previous period.

Example Embodiment and User Interfaces

Referring now to FIGS. 7-17, an example of one embodiment for different graphical user interfaces presented by the system 300 of the present invention is shown, and the user's interaction with the system 300 will be described. The present invention is particularly advantageous because it provides an interface in which the user can fully utilize the different characteristics of different search engines 308 while providing a simple mechanism to manage different campaigns. As noted above, the direct tracking module 302 in the ad creation module 508 provides a campaign wizard to assist the user 310 that operates as described below. As it was described above, this is in part accomplished using a keyword and creative repository 502.

Figure 7:
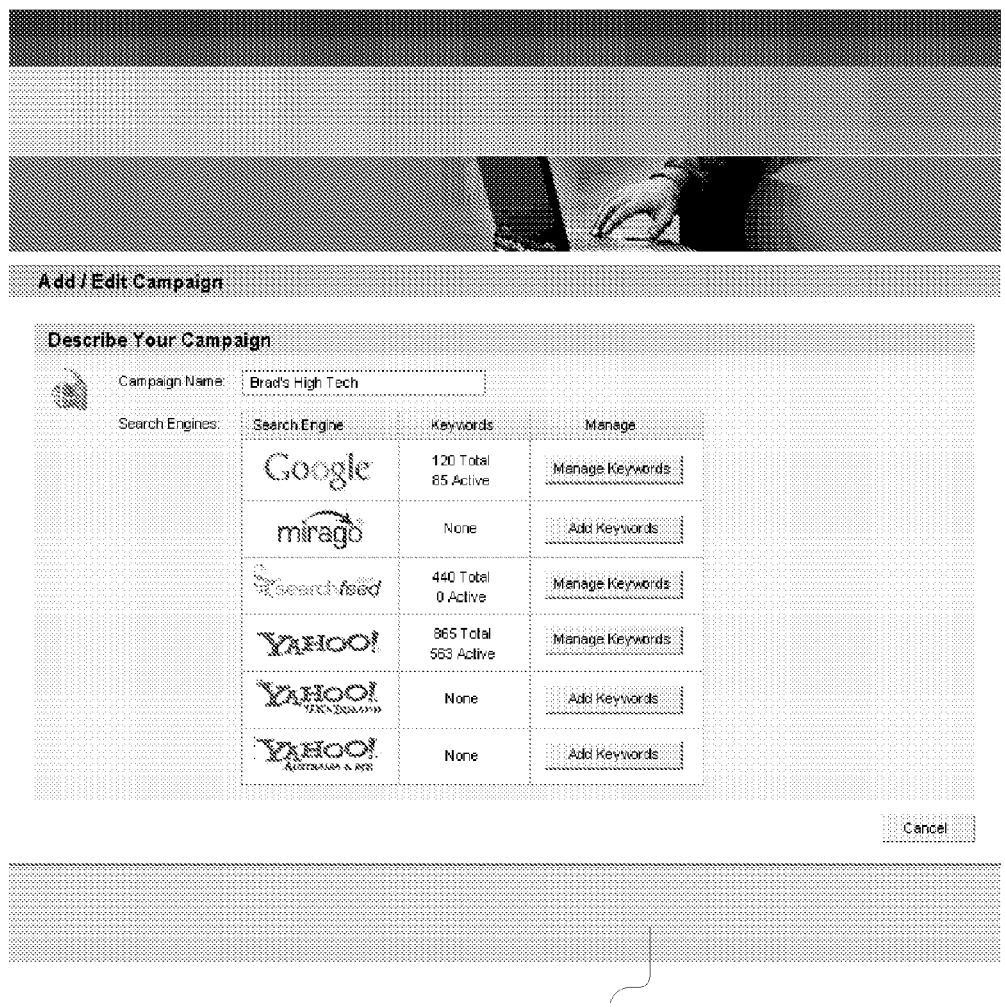

The process begins by presenting the user 310 with an interface 700 as shown in FIG. 7. This interface allows the user to describe their campaign, provide their campaign with a name and choose which search engines 308 to include in the campaign. This interface also provides the entire list of search engine accounts enabled by the user 301 along with other information.

Figure 8:
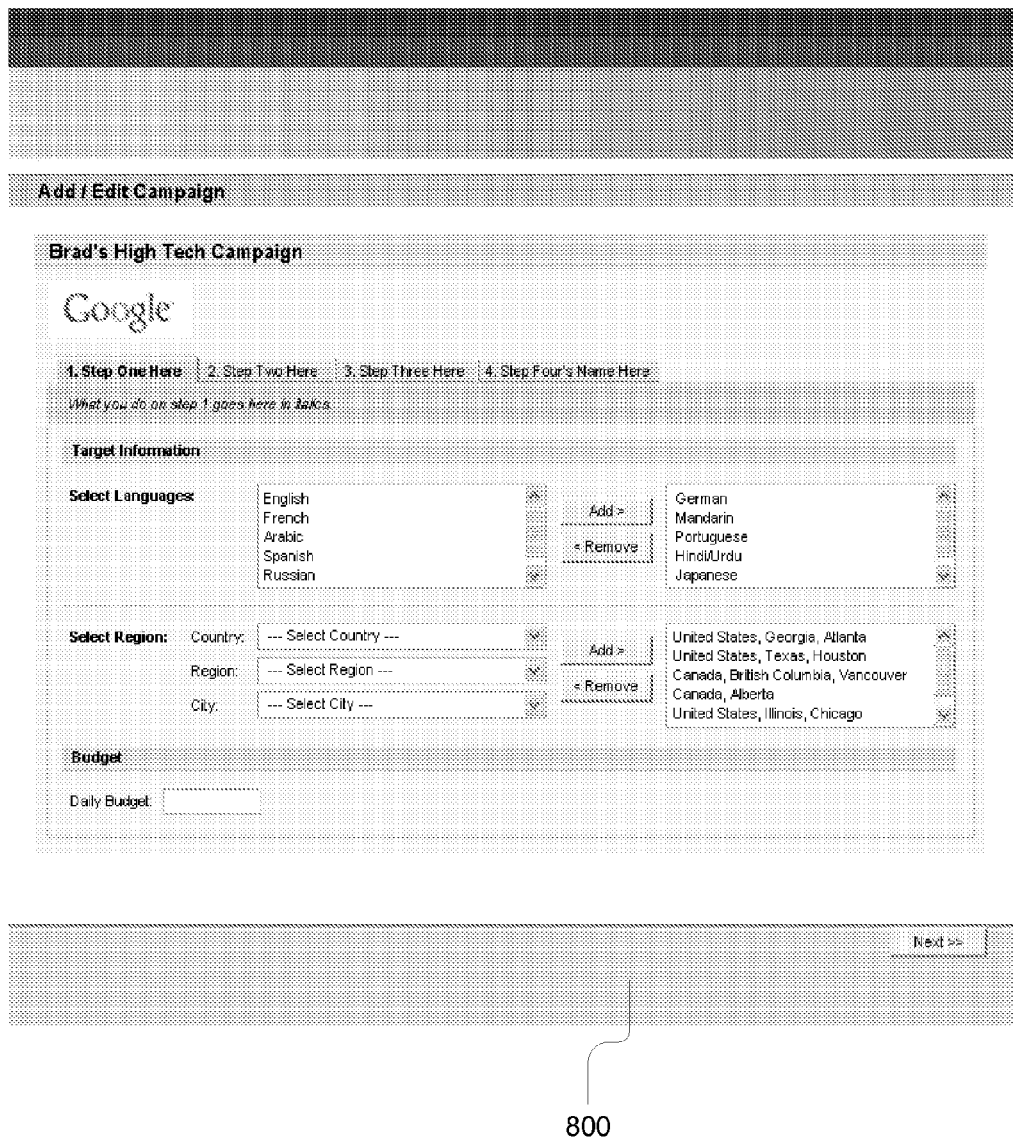

Next, the user is presented with an interface 800 as shown in FIG. 8 that allows the user to provide additional specificity to the campaign. For example, in one embodiment, if Google is selected as the search engine 308, then target information and a budget may also be specified for the campaign using the interface 800. This interface 800 also lets the user 310 target ad audiences by specifying a language and a region. Multiple regions and languages can be selected at once, but the defaults are English and all countries and regions. This interface 800 also lets the user 310 specify a daily budget for the campaign. This can be done consistent to the parameters of operation of the particular search engine, such as Google AdWords Management.

Figure 9:
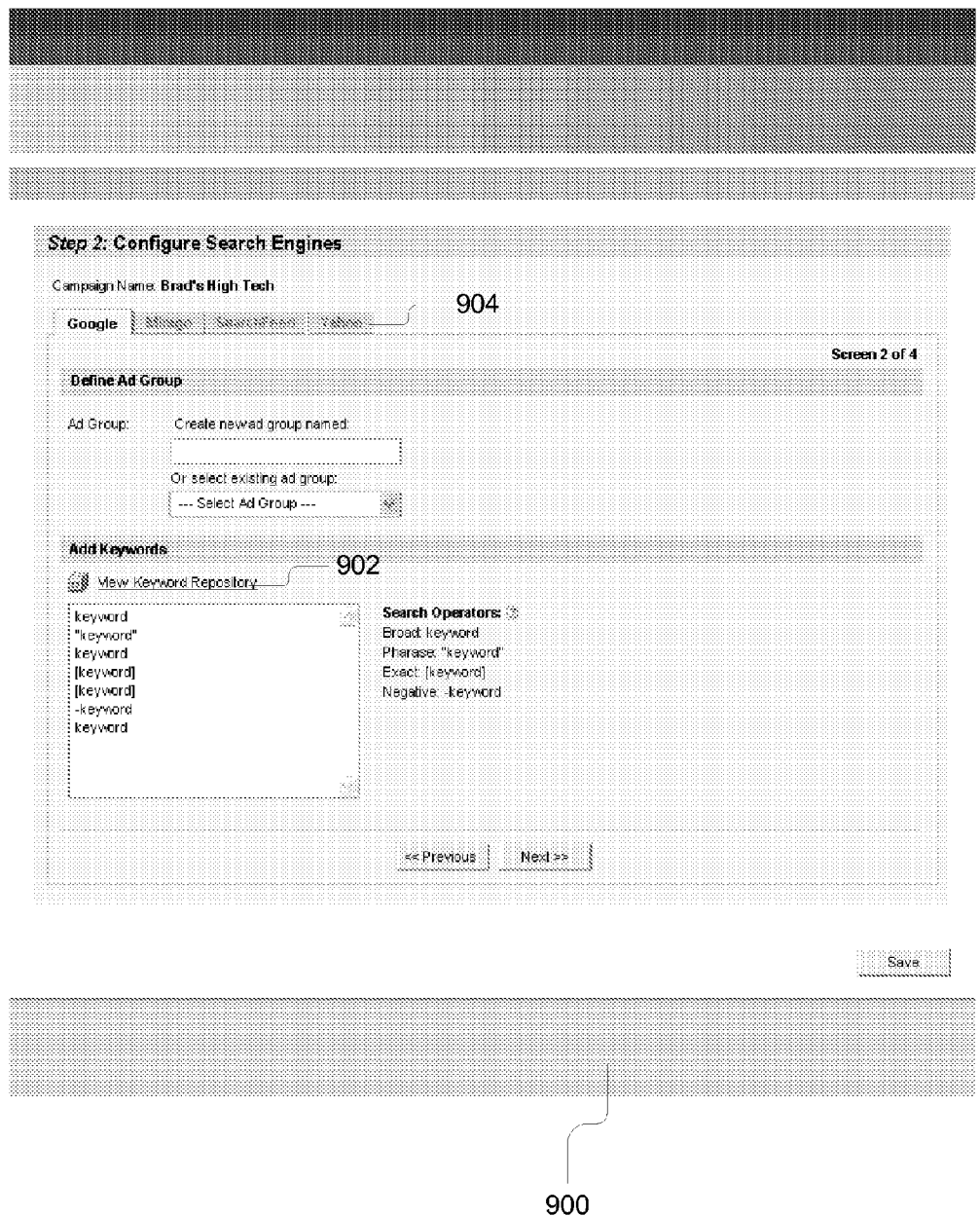

Next, the user begins the process of creating an ad group of keywords using the interface 900 shown in FIG. 9. This interface 900 advantageously has different layout tailored to the particular search engine 308 that are differentiated by tabs 904. This interface 900 is the starting point for ad group creation in Google. Google Ad Groups are "ad centric", meaning that keywords in these groups are grouped by the ads they share in common. For ease of use, the present invention drives the user 310 to enter keywords first, and then decide on the ads to show for those keywords. Users can enter keywords manually, or click on the "view keyword repository" link 902 to repurpose keywords for the same campaign that may have been entered for the same campaign under a different search engine. Those skilled in the art will recognize that the present invention includes a different order in which text ads are done first then keywords are specified. Those skilled in the art will recognize that the interface 900 may also include additional information such as a position in a flow creation to provide the user with feedback as to which step in a particular flow they are executing. This is particularly advantageous if the order of the flow (keyword first v. text first) is different for different search engines 308. For example, the interface 900 may show all the steps along the bottom as tabs or something that lets the user 310 choose which path they would like to take through the flow, like create text ads first, or enter keywords first.

Figure 10:
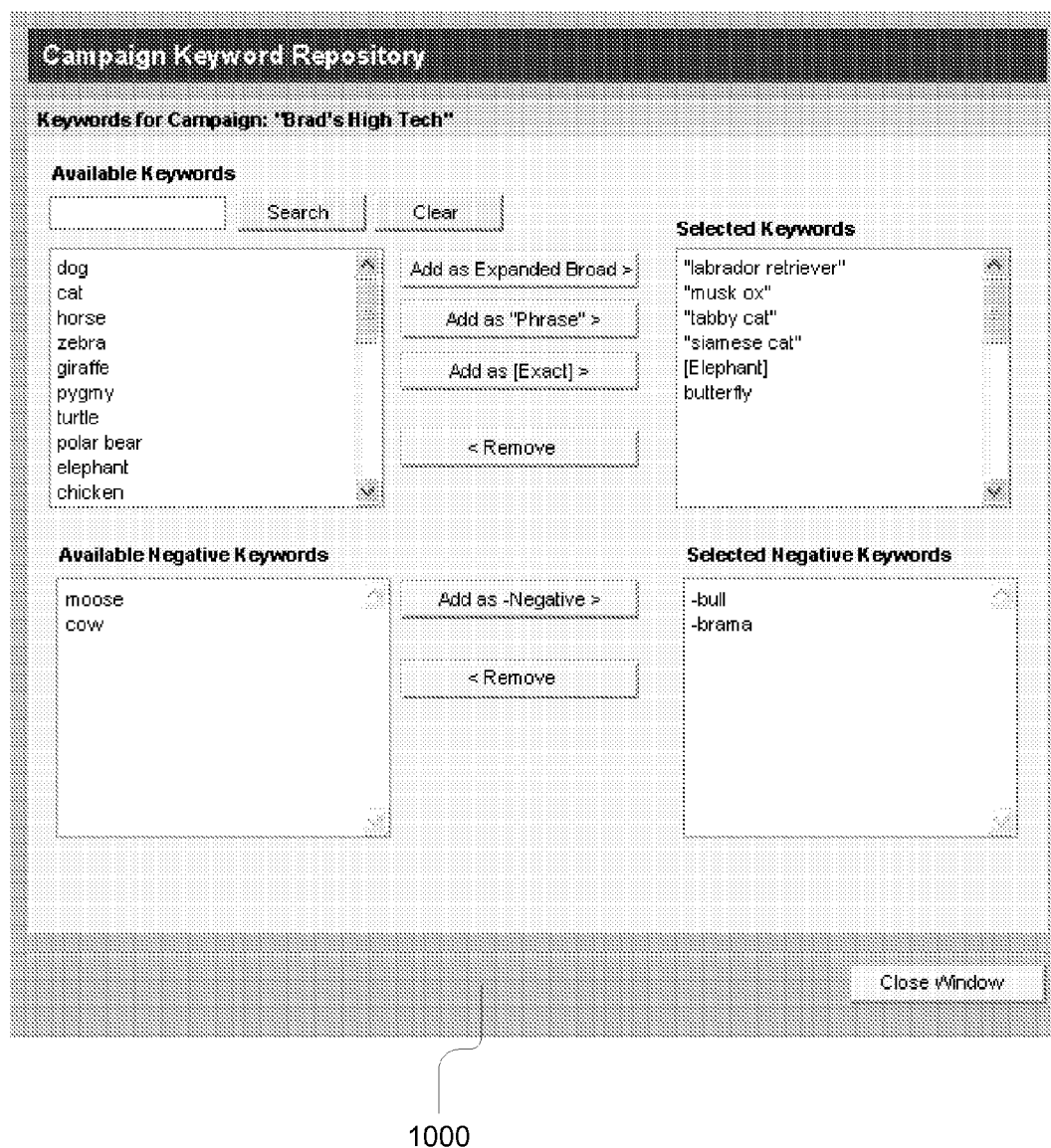

Another interface 1000 in the campaign creation process for keywords is shown in FIG. 10. This interface 1000 shows all of the keywords entered for the campaign to this point. This is useful for repurposing keywords from one search engine 308 to another. In this embodiment, the list of available keywords is sorted alphabetically. When a user 310 searches, the list is scrolled down and a keyword is highlighted as the user 310 types. Using this interface 1000, multiple keywords can be selected at once, and by clicking on the controls on the right the keyword is removed from the list for the search engine being operated on at the time: the keywords are also added to the selected keywords field. In one embodiment, the keywords in the repository 502 is a running list of all the keywords used in the campaign to that point, but excludes keywords that may have already been added to the search engine in focus at the time. Those skilled in the art will recognize that different search engines 308 have different constraints on keywords. For example, in Yahoo and other engines that do not allow more than one instance of a single keyword, the repository is used to enforce this, and make adding keywords simple. The keyword can be greyed out, and noted to indicate it has already been used in a previous campaign.

Figure 11:
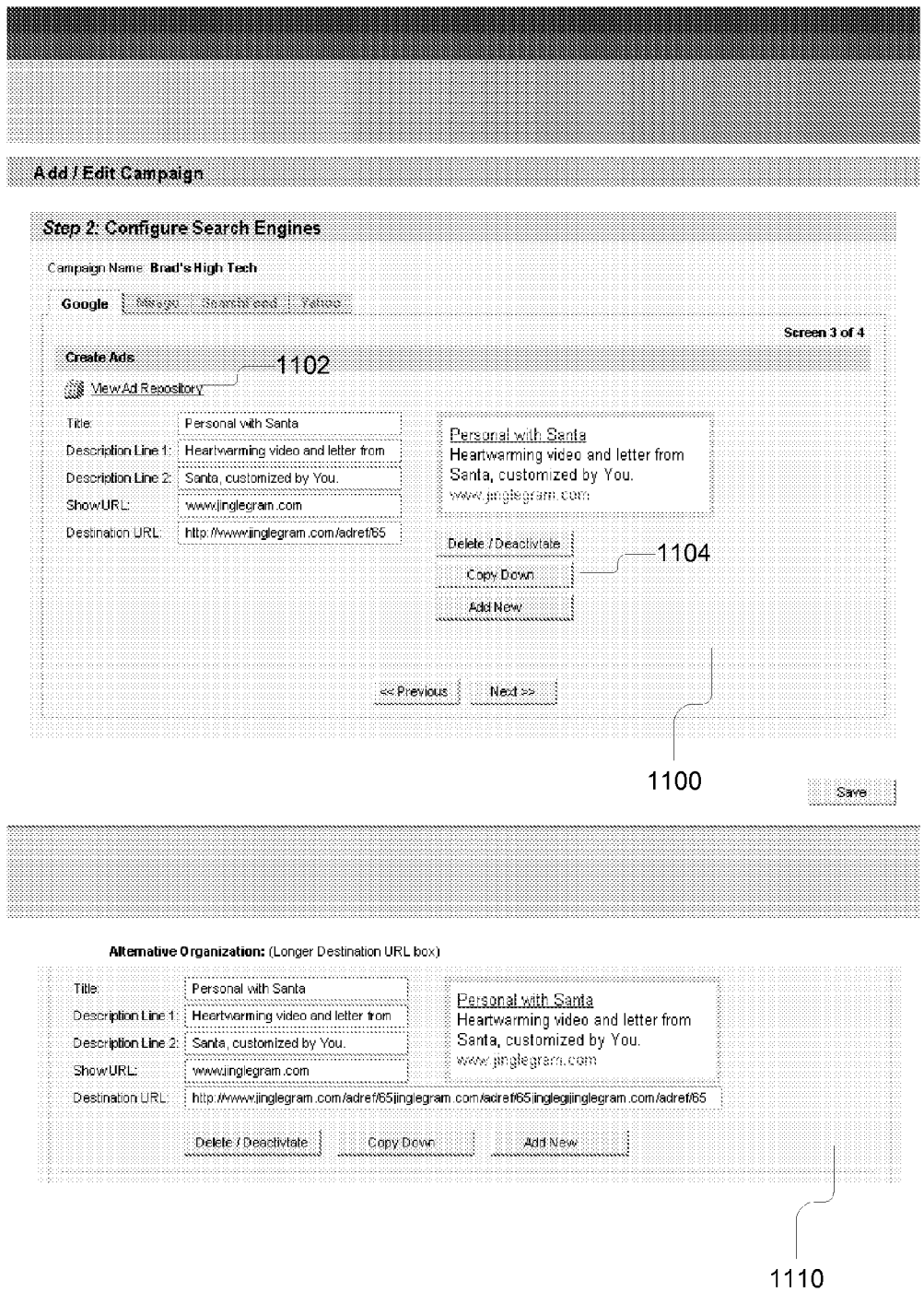

Another interface 1100 in the campaign creation process for ads/text is shown in FIG. 11. This interface 1100, much like the keywords screen, shows the ads/text for a campaign. This interface 1100 provides the user with the ability to define their text ads. A link 1102 to the ad repository is available to help repurpose ads that are already defined. A set of buttons 1104 is provided for manipulation of the ads/text, as well as a preview window and fields for entering the data forming the ads/text. The Delete/Deactivate button allows a user 310 to delete when the group has not been officially saved or to deactivate when the user has trafficked the ad, but no longer wishes to use it. The Copy Down button copies the ad definition fields, preview and buttons down below the ad in focus, pre-populating the fields with what they had above. The title fields of the copied ad get the cursor focus. The Add New button copies the definition fields and blank preview down below the ad in focus. The title field of the new ad gets the cursor focus. FIG. 11 also includes an alternate embodiment for the interface 1110.

Figure 12:
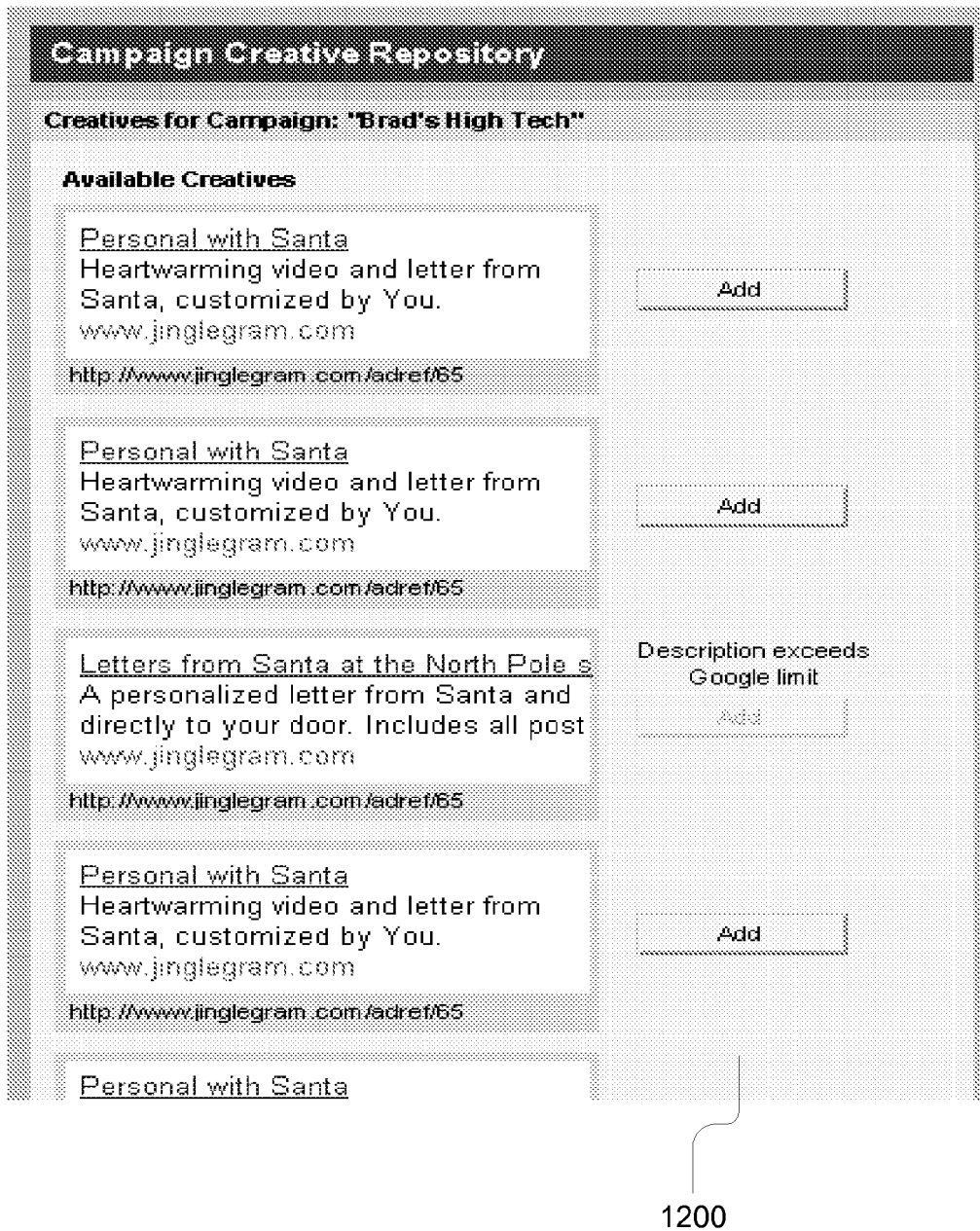

Another interface 1200 in the campaign creation process for ads/text is shown in FIG. 12. This interface 1200 shows ads that have been previously created. In one embodiment, the interface 1200 lists all of the ads defined previously for the same campaign. Clicking the Add button adds the definition fields and preview to the opener's list of text ads. In another embodiment, additional buttons can be added to the right of each ad such as "add title", "add description1", "add description 2", etc. The ads also include indications as to any limitation to repurposing the ad for other search engines. For example, if ads were created in Yahoo, and the user 310 is trying to repurpose those to Google, there would be problems with description lengths and so forth. The button to add such an ad can also be disabled.

Yet another interface 1300 in the campaign creation process is shown in FIG. 13. This interface 1300 allows the user 310 to configure all the settings that are at the keyword level. In particular, maximum CPC and destination URL can be set with the interface 1300. The Estimate Traffic link 1302 at the bottom provides advanced functionality for helping the user 310 find his or her optimal max CPC. For example, Max CPCs in Google have a min of $0.05 and a max of $100.

As shown in FIG. 14, the interface 1400 can be used to provide information on keywords with traffic. For example, the direct tracking module 302 gives the user insight into how their keywords will traffic in Google. This same interface 1400 with a modified heading label can be used to provide the actual data measure after the campaign has been run. Moreover, instead of keywords, traffic metrics on keyword-ads/text pairs can be provided with the present invention as well. Those skilled in the art will recognize how the interface 1400 of FIG. 14 could be modified as such as well as be modified to provide more or less web analytic data.

Figure 15:
Figure 16:
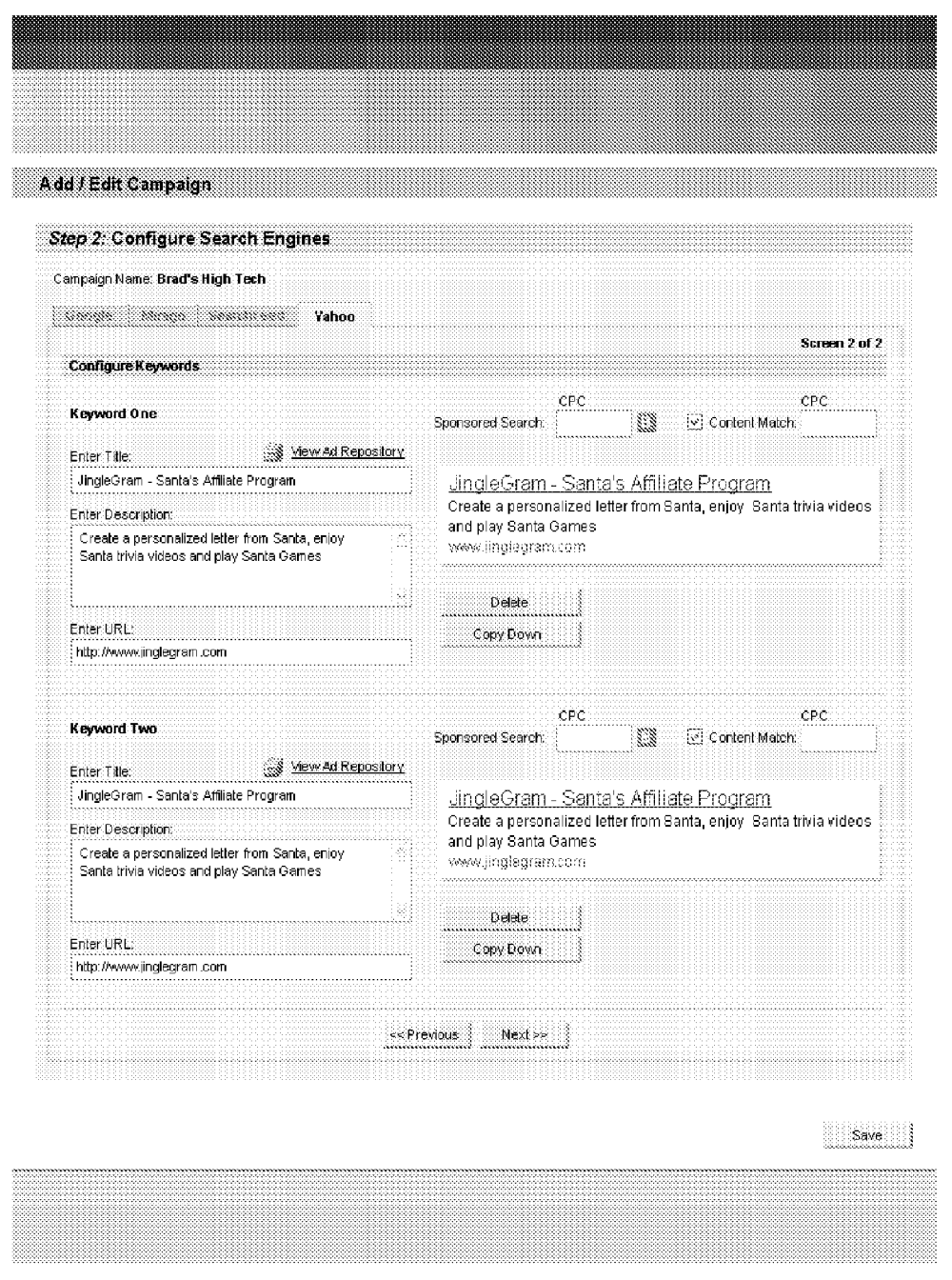

FIGS. 15-17 provide the same functionality as was described above, but use examples for a different search engine 308 such as Yahoo. FIG. 15 illustrates an interface for adding keywords in Yahoo. FIG. 16 illustrates an interface for adding ads/text. Finally, FIG. 17 illustrates an interface for viewing competitor bids.

The foregoing description of the embodiments of the present invention has been presented for the purposes of illustration and description. It is not intended to be exhaustive or to limit the present invention to the precise form disclosed. Many modifications and variations are possible in light of the above teaching. For example, the present invention may include additional interfaces that may be adapted for use with additional search engines. It is intended that the scope of the present invention be limited—not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, (an example of which is a module,) of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method, comprising:
    performing, using a computer:
        assigning a unique identifier to each of one or more keyword-advertisement pairs used for implementing an advertising campaign;
        assigning particular portions of analytics data resulting from the implementing the advertising campaign to particular ones of the unique identifiers assigned to respective ones of the one or more keyword-advertisement pairs such that each particular portion of the analytics data shares a unique identifier with a keyword-advertisement pair of the one or more keyword-advertisement pairs;
        receiving, via a user interface, advertisement campaign information comprising:
            one or more keywords to be purchased; and
            one or more advertisements to be displayed in response to activation of one or more of the keywords;
        generating a plurality of keyword-advertisement pairs, wherein each of the keyword-advertisement pairs specify:
            at least one of the keywords to be purchased; and
            one of the advertisements to be displayed in response to activation of the at least one of the keywords to be purchased;
        receiving, via the user interface, a request for an estimate of performance of the advertisement campaign;
        determining, in response to receiving the request for an estimate of performance of the advertisement campaign, an estimate of one or more analytic metrics for the one or more keywords to be purchased, wherein the estimate of performance of one or more analytic metrics for the one or more keywords to be purchased is based at least in part on historical information, and
        the estimating further comprises reviewing metrics for ones of the one or more keyword-advertisement that are selected for re-use; and
        providing, for display via the user interface, the estimate of one or more analytic metrics for the one or more keywords to be purchased.

2. The method of claim 1, wherein the one or more analytic metrics comprise a cost of the advertising campaign associated with each of the one or more keywords.

3. The method of claim 1, wherein the one or more analytic metrics comprise at least one of a cost-per-click (CPC), impressions, clicks, click-through rate (CTR) and cost.

4. The method of claim 1, wherein the estimate of one or more analytic metrics are displayed adjacent the particular keyword such that a user can ascertain an estimate of performance for each particular keyword.

5. The method of claim 1, further comprising:
    receiving analytics data corresponding to actual results of the advertisement campaign, wherein particular portions of the analytics data is associated with particular-advertisement pairs;
    providing, for display via the user interface, for each of the unique identifiers:
        the particular portion of the analytics data assigned to the unique identifier; and
        the keyword-advertisement pairs assigned to the unique identifiers.

6. The method of claim 1, wherein activation of the one or more keywords comprises selection of the advertisement by a search engine in response to user inputs to the search engine.

7. The method of claim 1, wherein the analytics data is received remotely from an analytics tool.

8. The method of claim 1, wherein the analytics data comprises web-analytics data.

9. The method of claim 1, wherein the advertisement campaign comprises the one or more advertisement being displayed to a user via an internet search engine.

10. A system for estimating performance of an advertisement campaign, the system comprising:
    a processor; and
    a computer-readable storage medium coupled to the processor and storing program code executable by the processor, the computer program code comprising:
        a measurement module configured to:
            assign a unique identifier to each of one or more keyword-advertisement pairs used for implementing an advertising campaign;
            assign particular portions of analytics data resulting from the implementing the advertising campaign to particular ones of the unique one or more unique identifiers assigned to the keyword-advertisement pairs such that each particular portion of the analytics data shares a unique identifier with a keyword-advertisement pair of the one or more keyword-advertisement pairs;
        a user interface module configured to:
            receive advertisement campaign information comprising:
                one or more keywords to be purchased; and
                one or more advertisements to be displayed in response to activation of one or more of the keywords; and
            receive a request for an estimate of performance of the advertisement campaign;
        a direct tracking module configured to generate a plurality of keyword-advertisement pairs, wherein each of the keyword-advertisement pairs specify:
            at least one of the keywords to be purchased; and one of the advertisements to be displayed in response to activation of the at least one of the keywords to be purchased; and an estimator module configured to determine, in response to receiving the request for an estimate of performance of the advertisement campaign, an estimate of one or more analytic metrics for the one or more keywords to be purchased, wherein the estimate of performance of one or more analytic metrics for the one or more keywords to be purchased is based at least in part on historical information, wherein the user interface module is further configured to provide for the display of the estimate of one or more analytic metrics for the one or more keywords to be purchased, and wherein the estimator module is further configured to review metrics for ones of the one or more keyword-advertisement that are selected for re-use.

11. A method, comprising:

performing, using a computer:

receiving, via a user interface, advertisement campaign information comprising:

one or more keywords to be purchased; and one or more advertisement to be displayed in response to activation of one or more of the keywords;

generating a plurality of keyword-advertisement pairs, wherein each of the keyword-advertisement pairs specify:

at least one of the keywords to be purchased; and one of the advertisements to be displayed in response to activation of the at least one of the keywords to be purchased;

assigning a unique identifier to each of the keyword-advertisement pairs;

implementing the advertisement campaign;

receiving analytics data corresponding to actual results of the advertisement campaign, wherein particular portions of the analytics data is associated with particular-advertisement pairs;

assigning each particular portion of the analytics data to a particular one of the unique identifiers assigned to the keyword-advertisement pairs such that each particular portion of the analytics data shares a unique identifier with an associated keyword-advertisement pair; and providing, for display via the user interface, for each of the unique identifiers:

the particular portion of the analytics data assigned to the unique identifier; and the keyword-advertisement pairs assigned to the unique identifier.

12. The method of claim 11, wherein the analytics data comprises information describing behavior of visitors of a network site.

13. The method of claim 11, wherein assigning a unique identifier to each of the keyword-advertisement pairs comprises:

identifying each possible combination of the one or more keywords to be purchased and the one or more advertisement to be displayed in response to activation of one or more of the keywords; and assigning a unique code to each possible combination identified.

14. The method of claim 11, wherein the particular portion of the analytics data assigned to the unique identifier is displayed adjacent the keyword-advertisement pairs assigned to the unique identifier such that a user can ascertain a performance for each particular keyword-advertisement pair.

15. The method of claim 11, wherein activation of the one or more keywords comprises selection of the advertisement by a search engine in response to user inputs to the search engine.

16. The method of claim 11, wherein the analytics data is received remotely from an analytics tool.

17. The method of claim 11, wherein the analytics data comprises web-analytics data.

18. The method of claim 11, wherein the advertisement campaign comprises the one or more advertisement being displayed to a user via an internet search engine.

* * * * *